US009110624B2

(12) United States Patent
Herz et al.

(10) Patent No.: US 9,110,624 B2
(45) Date of Patent: Aug. 18, 2015

(54) OUTPUT RESTORATION WITH INPUT SELECTION (75) Inventors: William S. Herz, Hayward, CA (US); Gang Han, San Jose, CA (US)

(73) Assignee: NVDIA CORPORATION, Santa Clara, CA (US)

( * ) Notice: Subject to any disclaimer, the term of this patent is extended or adjusted under 35 U.S.C. 154(b) by 1334 days.

(21) Appl. No.: 11/903,275

(22) Filed: Sep. 21, 2007

(65) Prior Publication Data

US 2009/0079686 A1  Mar. 26, 2009

(51) Int. Cl.
G06F 15/00 (2006.01)
G06F 17/00 (2006.01)
G09G 3/36 (2006.01)
G09G 5/00 (2006.01)
G06F 3/14 (2006.01)

(52) U.S. Cl.
CPC ............. *G06F 3/14* (2013.01); *G06F 3/1423* (2013.01); *G09G 5/006* (2013.01); *G09G 2340/0407* (2013.01); *G09G 2360/02* (2013.01); *G09G 2370/042* (2013.01); *G09G 2370/045* (2013.01)

(58) Field of Classification Search
USPC ............ 345/1.1–3.4, 156–179, 100, 418, 501
See application file for complete search history.

(56) References Cited

U.S. PATENT DOCUMENTS

| 4,926,166 | A | 5/1990 | Fujisawa et al. |
| 5,448,260 | A | 9/1995 | Zenda et al. |
| 5,572,649 | A | 11/1996 | Elliott et al. |
| 5,606,348 | A | 2/1997 | Chiu |
| 5,699,076 | A | 12/1997 | Tomiyasu |
| 5,740,352 | A | 4/1998 | Philipp et al. |
| 6,104,334 | A * | 8/2000 | Allport .......................... 345/169 |
| 6,104,359 | A * | 8/2000 | Endres et al. .................. 345/589 |
| 6,421,042 | B1 | 7/2002 | Omura et al. |
| 6,509,911 | B1 | 1/2003 | Shimotono |
| 6,614,422 | B1 | 9/2003 | Rafii et al. |
| 6,639,613 | B1 | 10/2003 | Nason et al. |
| 6,832,237 | B1 | 12/2004 | Christensen et al. |
| 6,847,335 | B1 * | 1/2005 | Chang et al. .................... 345/3.1 |
| 6,907,482 | B2 | 6/2005 | Maciesowicz |
| 6,992,987 | B2 | 1/2006 | Kobayashi |
| 7,091,984 | B1 | 8/2006 | Clark |
| 7,139,850 | B2 | 11/2006 | Amemiya et al. |
| 7,334,054 | B2 | 2/2008 | Anderson |
| 7,716,702 | B2 | 5/2010 | Helms |
| 9,001,016 | B2 | 4/2015 | Herz et al. |
| 2002/0003507 | A1 | 1/2002 | Dodge |
| 2002/0149541 | A1 * | 10/2002 | Shin ............................... 345/3.1 |
| 2003/0098819 | A1 | 5/2003 | Sukthankar et al. |
| 2004/0013434 | A1 | 1/2004 | Hua |
| 2004/0035316 | A1 | 2/2004 | Chebiam et al. |
| 2004/0095292 | A1 | 5/2004 | Ogura |
| 2004/0130526 | A1 | 7/2004 | Rosenberg |
| 2004/0252075 | A1 | 12/2004 | Matsubara |
| 2004/0257332 | A1 | 12/2004 | Turgeman |

(Continued)

*Primary Examiner* — Waseem Moorad (57) ABSTRACT

A method for restoring visual output to a display device. The method includes detecting a display device connection change on an output connector and changing output settings to a compatible output mode on the output connector. The method further includes cloning graphics output to the output connector. The graphics output is modified for display on the output connector. The display device is signaled to change the input source to correspond to the output connector. Subsequently, a control panel application is executed to present an on-display control for changing the output mode of the first output connector.

22 Claims, 7 Drawing Sheets

(56) References Cited

U.S. PATENT DOCUMENTS

| | | |
|---|---|---|
| 2005/0162434 A1 | 7/2005 | Hancock et al. |
| 2005/0275641 A1 | 12/2005 | Franz |
| 2006/0136764 A1 | 6/2006 | Munguia |
| 2006/0139345 A1 * | 6/2006 | Tseng et al. ................. 345/213 |
| 2006/0181607 A1 * | 8/2006 | McNelley et al. ......... 348/14.08 |
| 2006/0282855 A1 | 12/2006 | Margulis |
| 2007/0067498 A1 * | 3/2007 | Lippert et al. .................... 710/1 |
| 2007/0280646 A1 | 12/2007 | Seita et al. |
| 2007/0283239 A1 | 12/2007 | Morris |
| 2009/0073101 A1 | 3/2009 | Herz et al. |

* cited by examiner

OUTPUT RESTORATION WITH INPUT SELECTION

CROSS-REFERENCE TO RELATED APPLICATION

This application is related to commonly assigned U.S. patent application Ser. No. 11/903,291, entitled "LOAD SENSING FORCED MODE LOCK" by Herz et al., which is incorporated herein in its entirety.

FIELD OF THE INVENTION

The present invention is generally related to hardware graphics systems.

BACKGROUND OF THE INVENTION

Increasing distribution of digital content has helped the growth of more advanced display technologies such as high definition televisions. At the same time computers have developed an increasing role in entertainment systems and thus are connected with high definition devices such as televisions. In order to get the best possible visual experience, the output settings need to match content format and the capabilities of the display device. Therefore, there are times when a user will need to change the resolution of the output or when a new device is connected.

A problem exists however when the user sets output settings (e.g., resolution or refresh rate) beyond the capabilities of a display device. For example, the user may be trying to watch a high definition DVD and sets the display resolution to a "1080 p" while the display device (e.g., plasma television) only supports a display resolution up to 720 p. Such changes to the display resolution are typically implemented via a television handheld remote control that manipulates one or more on-screen menus (e.g., a menu of options graphically presented on the television screen). Upon pressing the remote control button to select the high-resolution, the user will then be presented with either a blank screen or a corrupted and incomprehensible video signal because the display device is not capable of displaying the output.

Some prior art solutions have attempted to solve this problem (e.g., the user selecting an unsupported display resolution) by waiting for the user to acknowledge that the resolution change worked. If no acknowledgement is received within a defined time out period the resolution is restored to the previous working resolution. Unfortunately, this time out method is not consistently reliable, because depending upon how it is implemented (e.g., set-top box, media center PC, etc.), the timeout function may freeze or stop functioning.

With respect to PC-based systems (e.g., small form factor set-top box PC systems, wired or wirelessly connected PCs, etc.), the software-based functionality (e.g. operating systems) of the systems may not provide even a time out mechanism. In this case, the user will be stuck with the unsupported resolution. For example, the user may be stuck with a blank screen because he/she cannot see an application on screen, control panel menu, or the like to fix the output settings. Being suddenly confronted with a blank screen, the user may also not realize what the mistake was and further be stuck because he/she does not know how to go about fixing the problem. In some instances, the only solution to restore the resolution is to reboot or restart the computer system.

In some instances, the user may then try to unplug the current display device and plug in another display device in an attempt to regain comprehensible visual output. Unfortunately, the output settings may exceed the capabilities of the newly attached display device and the user remains stuck with incomprehensible display device output.

Display devices often have multiple inputs which may be used to drive the visual output of a display device. Given the plurality of inputs on a display device, it may be confusing and time consuming for a user to cycle through the various input sources to find the input source corresponding to the recently connected connector. Once the user connects a new display device or a different display device connector, the display device may not be using the appropriate input as a source for visual output. The user may then become confused because he/she will then need to manually change the input the display device is using for visual output. For example, a user may have unplugged the HDMI connection and connected the composite connection; the user may become confused after connecting the composite connector and not seeing visual output on the display device. The user will then need to change the input on the display device to the composite input in order to restore visual output of the display device.

Thus, a need exists for a reliable way for visual output of a display device to be automatically restored after a user has disconnected or connected a display device so that the output is not left at a resolution unsupported by a display device. What is further needed is a way to automatically return to a displayable resolution and the corresponding input selected so the user is not presented with a blank screen, and thus no on screen menu or interface that can correct the problem. The required system should be transparent and intuitively comprehended by the user.

SUMMARY OF THE INVENTION

Embodiments of the present invention provide a solution that enables a user to reliably restore the output to settings supported by a display device. Embodiments of the present invention further provide a user with a transparent and intuitively comprehended system for restoring output settings and usability of a display device.

In one embodiment, the present invention is implemented as a method for restoring display output to a display device (e.g., LCD display, projection TV display, plasma display, and the like). The method includes detecting a display device connection change (e.g., connection or disconnection) on an output connector (e.g., HDMI, DVI, and the like) and in response output settings (e.g., resolution and/or refresh rate) are changed to a compatible output mode (e.g., NTSC standard 480i, etc.) on the connected output connector. The display device is signaled to change the input source to the input corresponding to the connected output connector. The graphics output is cloned to the output connector, such that the graphics output is modified for display on the output connector. Additionally, a control panel application is executed to present an on-display control for changing the output settings.

In this manner, embodiments of the present invention implement a reliable way for a user to restore the display output to a mode that will be supported by the display device and the visual output is automatically restored via changing to the appropriate input on the display device. The user can be provided with an option to turn on a redundant connection mode that will automatically initiate the restoration of the display to a compatible resolution upon the connection or disconnection of a display device, thereby, for example, greatly assisting the user in those circumstances where the user inadvertently changes the output mode of the display output to an unusable output. Additionally, the user may be presented with the option to select the connected display device. The corresponding information about the selected device may be used to signal the display device to change inputs. The input on the input on the display device may then be changed to an input corresponding to a connection supporting a compatible output mode.

In another embodiment, the present invention is implemented as a system for outputting graphics. The system includes a plurality of output connectors (e.g., DVI, VGA, Component, etc.) for coupling a plurality of display devices. The display devices are driven by a display processor for handling graphics processing and outputting video signals on the plurality of output connectors. A second processor controls a plurality of functions of the display processor by executing a display driver and an application for changing a plurality of graphics settings of the display device. When a display device is connected or disconnected, the display processor is signaled and the output settings of at least one output connector are set to a compatible output mode (e.g., 480i). The connection or disconnection of a display device further facilitates the signaling of the display device to change the source input corresponding connected connector.

In another embodiment, the present invention is implemented as a method for restoring visual output on a display device via a second output connection. The method includes checking if a redundant display mode is enabled. If a redundant display mode is enabled, a plurality of video signals is broadcast to plurality of output ports coupled to a display device. An interrupt signal is received in response to a disconnection or connection of a display device from a graphics processing unit. In response to the interrupt signal, output settings are reconfigured for at least one of the connected plurality of output ports to a compatible output mode (e.g., 480i or the like). Information is transmitted to the display device to change the selected input source on the display device to at least one connected output connector. Additionally, an output settings configuration application is invoked for changing the output settings for said plurality of output ports.

BRIEF DESCRIPTION OF THE DRAWINGS

The present invention is illustrated by way of example, and not by way of limitation, in the figures of the accompanying drawings and in which like reference numerals refer to similar elements.

DETAILED DESCRIPTION OF THE INVENTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail as not to unnecessarily obscure aspects of the embodiments of the present invention.

Notation and Nomenclature:

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or the like, refer to the action and processes of a computer system (e.g., computer system 100 of FIG. 1), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
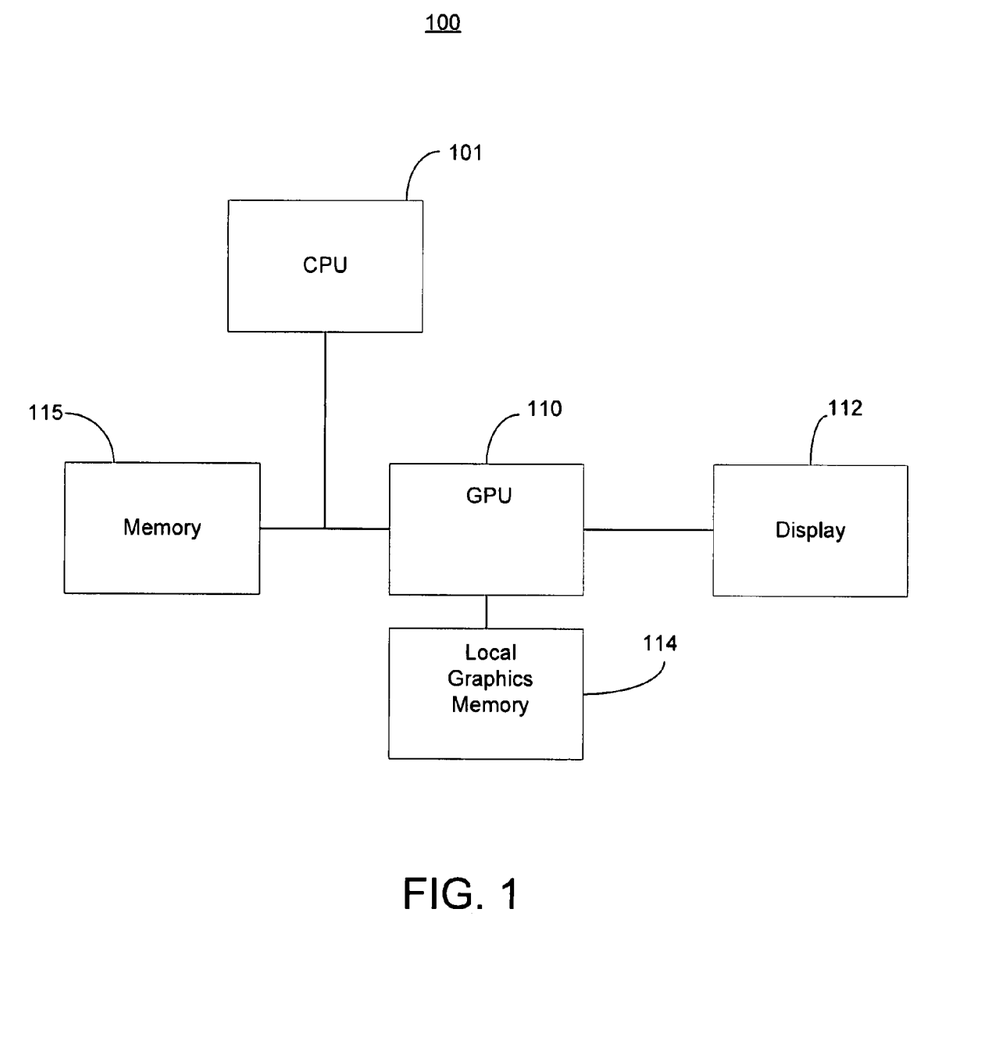
FIG. 1 shows a computer system in accordance with one embodiment of the present invention.

Computer System Platform:

FIG. 1 shows a computer system 100 in accordance with one embodiment of the present invention. Computer system 100 depicts the components of a basic computer system in accordance with embodiments of the present invention providing the execution platform for certain hardware-based and software-based functionality. In general, computer system 100 comprises at least one CPU 101, a system memory 115, and at least one graphics processor unit (GPU) 110. The CPU 101 can be coupled to the system memory 115 via a bridge component/memory controller (not shown) or can be directly coupled to the system memory 115 via a memory controller (not shown) internal to the CPU 101. The GPU 110 is coupled to a display 112. One or more additional GPUs can optionally be coupled to system 100 to further increase its computational power. The GPU(s) 110 is coupled to the CPU 101 and the system memory 115. The GPU 110 can be implemented as a discrete component, a discrete graphics card designed to couple to the computer system 100 via a connector (e.g., AGP slot, PCI-Express slot, etc.), a discrete integrated circuit die (e.g., mounted directly on a motherboard), or as an integrated GPU included within the integrated circuit die of a computer system chipset component (not shown). Additionally, a local graphics memory 114 can be included for the GPU 110 for high bandwidth graphics data storage.

The CPU 101 and the GPU 110 can also be integrated into a single integrated circuit die and the CPU and GPU may share various resources, such as instruction logic, buffers, functional units and so on, or separate resources may be provided for graphics and general-purpose operations. Accordingly, any or all the circuits and/or functionality described herein as being associated with the GPU 110 can also be implemented in, and performed by, a suitably equipped CPU 101. Additionally, while embodiments herein may make reference to a GPU, it should be noted that the described circuits and/or functionality can also be implemented and other types of processors (e.g., general purpose or other special-purpose coprocessors) or within a CPU.

System 100 can be implemented as, for example, a desktop computer system or server computer system having a powerful general-purpose CPU 101 coupled to a dedicated graphics rendering GPU 110. In such an embodiment, components can be included that add peripheral buses, specialized audio/video components, IO devices, and the like. Similarly, system 100 can be implemented as a handheld device (e.g., cell phone, etc.) or a set-top video game console device such as, for example, the Xbox®, available from Microsoft Corporation of Redmond, Wash., or the PlayStation3®, available from Sony Computer Entertainment Corporation of Tokyo, Japan. System 100 can also be implemented as a "system on a chip", where the electronics (e.g., the components 101, 115, 110, 114, and the like) of a computing device are wholly contained within a single integrated circuit die. Examples include a hand-held instrument with a display, a car navigation system, a portable entertainment system, and the like.

Embodiments of the Invention:

Embodiments of the present invention implement a method and system for the restoring output so that graphics output is visible on a display device. The method includes detecting a display device connection change on an output connector, changing output settings to a compatible output mode on the output connector, cloning graphics output to the output connector, wherein the graphics output is modified for display on the output connector, signaling the display device to change the input source of the display device, and executing a control panel application to present an on-display control for changing the output settings. The present invention may be invoked by a user connecting or disconnecting a display device when the output on a display is blank, corrupted, or incomprehensible in order to restore the output to a visible format. In one embodiment, upon the connection of a compatible output mode connector (e.g., composite), output settings are automatically adjusted to a lowest common denominator for the connection (e.g., 480i for a composite connection). In another embodiment, when an output compatible mode connector and another connector (e.g., HDMI) are connected, output will be sent out over both outputs with a compatible output mode (e.g., 480i) being output over the output compatible mode connector. Additionally, when more than one connector is connected, output settings for all connectors may be set to compatible output modes upon the connection or disconnection of an output connector. Embodiments of the present invention and their benefits are further described below.

Figure 2:
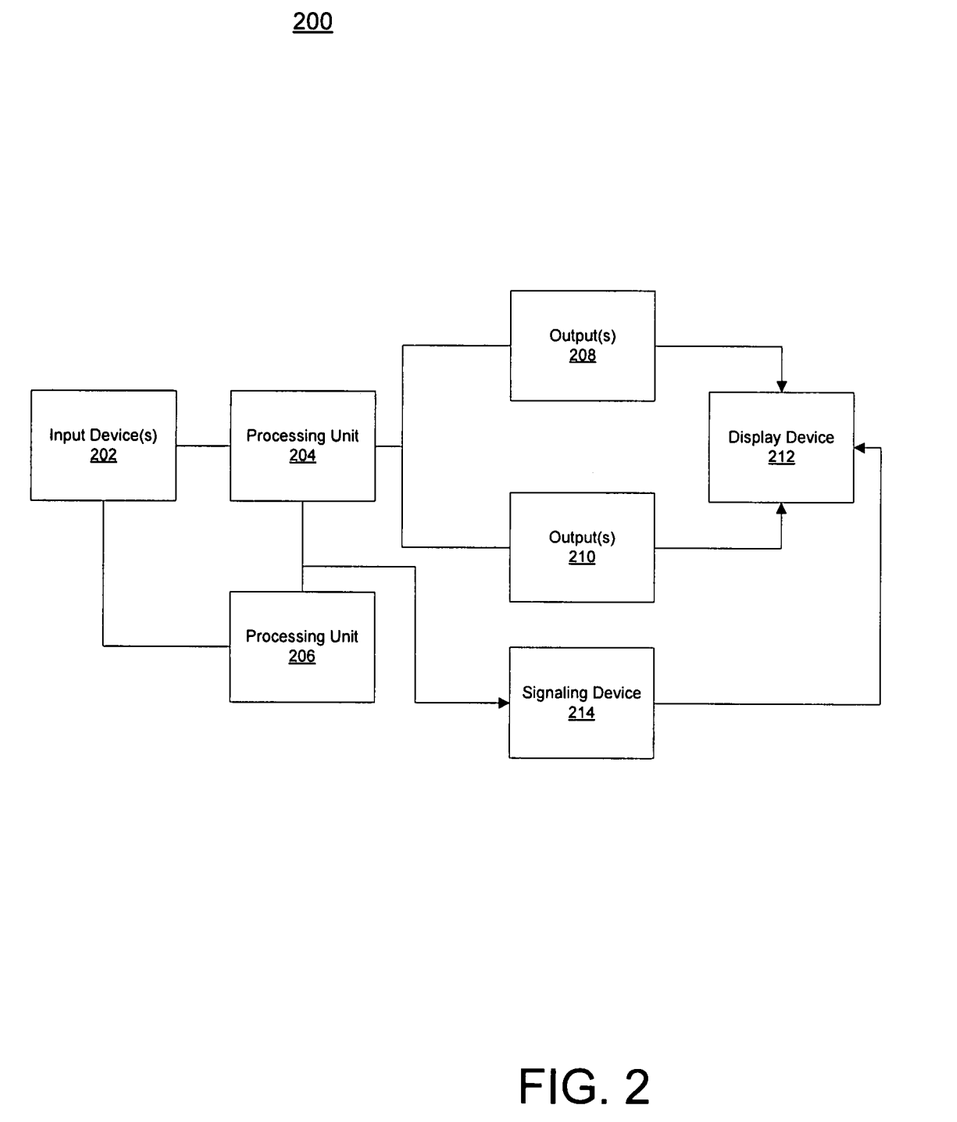
FIG. 2 shows a block diagram of a system in accordance with one embodiment of the present invention.

FIG. 2 shows a system 200 in accordance with an embodiment of the present invention. System 200 includes input device(s) 202, processing unit 204, processing unit 206, output(s) 208, output(s) 210, display device 212, and signaling device 214.

Input device(s) 202 may include devices such as a remote control, mouse, keyboard, or the like. Input device(s) 202 may be coupled to processing unit 204 and processing unit 206 via one or more of a plurality of connectors. Input device(s) 202 may be used to select a head or connector, resolution (e.g., 480i or 480 p etc.), format (e.g., NTSC or PAL), and other output settings. In one embodiment, processing unit 204 is a graphics processing unit (e.g., GPU 110 of FIG. 1) and is responsible for handling graphics data and rendering graphics data for output on outputs(s) 208 and output(s) 210 to display device 212. The input device(s) 202 may be used to enable a mode for restoring the output of processing unit 204 to display capable output settings for display on display device 212. Display Device detection (e.g., load detection or device signaling such as I²C based signaling) on various output connectors may further act as an input device by acting as a stimulus for processing unit 204 to restore output to an output compatible mode on one or more connectors. For example, if the user sets a resolution that is too high or exceeds the capabilities of display device 212, display device 212 may show nothing or corrupted or incomprehensible images and a user may then disconnect or connect to the output connector which signals processing unit 204 that visual output needs to be restored to an output compatible mode to allow the user to select the appropriate resolution for display device 212.

In one embodiment, the connection or disconnection of a display device (e.g., display device 212) generates a pulse which is received over a general purpose input output GPIO pin. The connection or disconnection of a display device may result from a user trying to regain visual output on a display device. Embodiments of the present invention can intelligently react to such a disconnection and interpret the disconnection/reconnection as the user attempting to restore a proper screen output on the display. Processing unit 204 may respond by triggering an event with sets off an interrupt to the driver of processing unit 204. The driver of processing unit 204 responds by configuring output settings to a compatible output mode (e.g., 480i) on compatible mode output(s) 210 (e.g., CVBS or composite). The driver may achieve a compatible output mode by scaling down the output and modifying the output timing corresponding to the compatible output mode as described further herein. In one embodiment, where a single graphics output is used to connect to a display device, the connection or disconnection of the display device causes a compatible output mode on the single output connector.

After a display device connection change (e.g., connection or disconnection), processing unit 204 or 206 may then facilitate a change in the input used for visual output. A determination of the appropriate compatible output connector may be made based on a plurality of connections enumerated (that are connected to a display device(s)). Display device 212 may be signaled by signaling device 214 to perform a variety of functions including changing the input source. Information may be accessed corresponding to the required signaling of the display device to perform various functions including, but not limited to, changing the selected input on the display device. Further, the appropriate signal, output settings, and compatible output mode may be determined based on EDID or information set via an output settings application (e.g., control panel application). For example, if a user has disconnected HDMI and connects an S-Video connection, display device 212 may be signaled to change the input source from HDMI to S-Video. In one embodiment, a set of generic or universal signals may be used to invoke the various functions of display device 212.

Signaling device 214 may be any of a plurality of wireless and wired devices, connectors, or ports including, but not limited to, infrared (IR) emitter, USB (Universal Serial Bus), serial, Ethernet, radio frequency (RF), or home automation (e.g., X10). In one embodiment, the appropriate signal is transmitted to display device 212 based on the currently connected connections or a plurality of available enumerated connections. Signaling device 214 may be coupled to both or either processing unit 204 and processing unit 206. Signaling device 214 may further be coupled to processing unit 204 or processing unit 206 via a GPIO pin. It is appreciated that signaling device 214 may be part of system 200 or system 100 such as a network adapter or USB ports or a standalone device.

Processing unit 206 may be coupled to processing unit 204. In one embodiment, processing unit 206 (e.g., CPU 101) may execute a display driver for controlling a plurality of functions and operations of processing unit 204 and may execute an application for changing a plurality of graphics settings (e.g., a control panel application).

In one embodiment, a button on input device(s) 202 (e.g., remote control) may be used to enable or set a redundant display mode. For example, when a user is first setting up or configuring a computing system, he or she may be presented with the option to enable a redundant display mode to assist the user in recovering from the situation where display settings exceed the capabilities of a display device. An output settings application (e.g., control panel application) may also allow a user to enable a redundant display mode at any time.

In one embodiment, processing unit 204 may clone output on output(s) 208 to output(s) 210 so that a user can switch to output(s) 210 (e.g., composite) and be guaranteed visual output via output(s) 210. It is appreciated that output(s) 208 and output(s) 210 may be coupled to different display devices and embodiments of the present invention facilitate the restoration of output settings corresponding to the display device which is displaying incomprehensible output.

In one embodiment, output(s) 208 may be digital output(s) and output(s) 210 may be analog outputs. For example, output(s) 208 (e.g., HDMI, DVI, or display port) may be used for outputting a high definition signal (e.g., 720 p) to a display device 212 (e.g., plasma television). Output(s) 210 (e.g., composite or S-video) may be activated and a compatible mode (e.g., 480i) is broadcast over output(s) 210 after a signal is received to restore visual output. In one embodiment, all outputs may be configured to a compatible output mode (e.g., 480i).

A control panel application may be invoked which allows a user to change the display settings to restore the output settings on output(s) 208. For example, the user may switch over to the composite input on display device 212 which is being driven by 480i output of output(s) 210 and use the control panel application to adjust the output settings for output(s) 208 back to a resolution supported by display device 212 (e.g., 720 p). The output of output(s) 208 may be cloned to output(s) 210 and adjusted corresponding to a compatible output mode (e.g., resolution, output timing, and refresh rate). The cloning of outputs output(s) 208 to output(s) 210 facilitates the use of the control panel where only one instance of the control panel is allowed. In one embodiment, the control panel application may have a user interface suitable for viewing on a television from a distance (e.g., living room setting).

Figure 3:
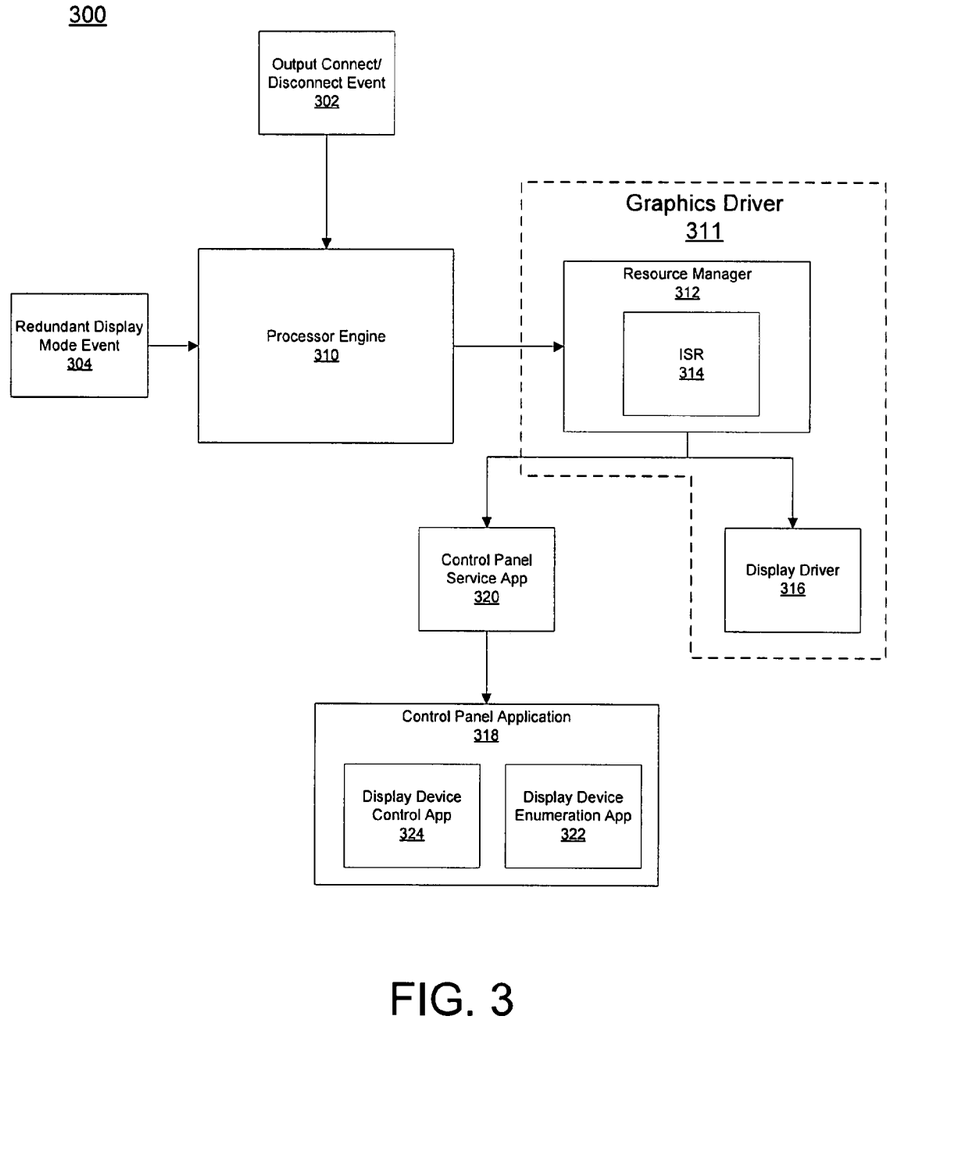
FIG. 3 shows a diagram of a system for restoring output to a display device in accordance with one embodiment of the present invention.

FIG. 3 shows a system 300 for restoring output to a display device in accordance with one embodiment of the present invention. As depicted in FIG. 3, the components 302-324 implement the functionality for restoring visual output mode for a coupled display device.

The FIG. 3 embodiment illustrates example components or modules that, in various embodiments, are instantiated and executed by a CPU (e.g., CPU 101 of FIG. 1) and/or a GPU (e.g., GPU 110) under the control of computer-readable and computer-executable instructions. However, it should be appreciated that the aforementioned components of system 300 can be implemented in hardware or software or in a combination of both, and that various other components or variations of the components recited in system 300 can be used to implement the functionality of embodiment of the present invention.

In one embodiment, as depicted in FIG. 3, system 300 includes output connect/disconnect event 302, redundant display mode request event 304, a processor engine 310 (e.g., as executed by hardware/software of a GPU), control panel application 318, control panel service app 320, display device enumeration app 322, and graphics driver 311 which includes resource manager 312, interrupt service routine (ISR) 314, and display driver 316. Control panel application 318 may include display device control application 324 and display device enumeration application 322.

Processor engine 310 may receive signals from output connect/disconnect event 302 and redundant display mode request event 304. It is appreciated that processor engine 310 may receive signals via other buttons and interfaces with the same signal being issued to processor engine 310. For example, processor engine 310 may receive an output connect/disconnect event 302 as an interrupt signal generated after a DVI connection is disconnected. It is further appreciated that output connect/disconnect event 302 may be based or initiated on load detection, hot pluggable standards, or device signaling (e.g., via $I^2C$).

After a user has changed the output resolution, the output of a coupled display device (e.g., display 112) may be blank, corrupted, or otherwise incomprehensible video. The user may trigger an output connect/disconnect event 302 in a variety of ways. For example, the user may attempt to restore output by plugging in another display device or unplugging and reconnecting the same display device. Processor engine 310 may receive a redundant display mode event 304 from an input device as described herein. For example, a user may enable a redundant display mode during the set up of a computing system, such that output will be set to a display capable resolution when a connection change is detected (e.g., output connect/disconnect event 302).

Processing engine 310 may then signal resource manager 312 that visual output needs to be restored. In one embodiment, processing engine 310 generates an interrupt based on output connect/disconnect event 302 or redundant display mode event 304 which is handled by interrupt service routine module (ISR) 314 which is part of resource manager 312. Resource manager 312 may be part of a graphics driver 311 which runs in protected or kernel mode of an operating system.

In one embodiment, as part of handling the interrupt, interrupt service routine module 314 may signal display driver 316 that the output needs to be restored. Display driver 316 may then modify the graphics processing of processor engine 310 as described further below with reference to FIG. 4.

In one embodiment, interrupt service routine 314 invokes control panel service application 320. In another embodiment, display driver 316 may invoke control panel service application 320. Control panel service application 320 may then invoke control panel application 318. Control panel application 318 allows a user to change the output settings for the various connectors coupled to a display device. For example, if a user can no longer see visual output on a display device via an HDMI connection, the composite output may be used to restore visual output to the display device and the user may use the control panel to adjust the output settings on the HDMI cable. In one embodiment, where there is a single connector changes to output settings may be not be executed or carried out until another output is connected. For example, output settings may be adjusted via a composite connection but not applied until HDMI connected.

Control panel application 318 may signal or invoke display device enumeration application 322 which enumerates or determines the connected display devices and the connections used to connect the display devices. Information determined by display device enumeration app 322 may be used to choose an appropriate connector which is supported by a vast majority of devices (e.g., composite or S-video) to output a compatible output mode. For example, where a first output is connected to DVI and a second output is connected to YPrPb, the output on the YPrPb connection may be configured for a compatible output mode. It is appreciated that a compatible output mode can be a lowest possible resolution (480i) or another output mode (e.g., 720 p) tailored to the display device based on information provided by EDID or during the setup process. In one embodiment, the default output connector for compatible output mode is CVBS.

Control panel application 318 may further signal or invoke display device control application 324. Display device control application 324 may access display device information that was stored or selected via an output settings application (e.g., control panel application). In one embodiment, the information may have been selected or stored during setup. The display device information may be used by display device control application 324 to facilitate control of various functions of a display device (e.g., display device 212). Display device control application 324 may facilitate the signaling of a display device via a signaling device (e.g., signaling device 214) which may be communicatively coupled to a computing system (e.g., system 100) or other device as described herein. For example, upon adjustment of graphics output settings as described herein, display device control application 324 may signal a display device to change the input used for visual output to the input corresponding to the compatible output mode connector (e.g., composite). It is appreciated that display device control application 324 may signal a change of input to any of the inputs available on a display device.

The following discussion sets forth in detail the operations of the present technology for restoring visual output on a display device. With reference to FIGS. 4-7, flowcharts 400, 500 and 700 each illustrate example blocks used by various embodiments of the present technology. Flowcharts 400, 500 and 700 include processes that, in various embodiments, are carried out by a processor under the control of computer-readable and computer-executable instructions. Although, specific blocks are disclosed in flowcharts 400, 500, and 700, such blocks are examples. That is, embodiments are well suited to performing various other blocks or variations of the blocks recited in flowcharts 400, 500 and 700. It is appreciated that the blocks in flowcharts 400, 500, and 700 may be performed in an order different than presented, and that not all of the blocks in flowcharts 400, 500, and 700 may be performed.

Figure 4:
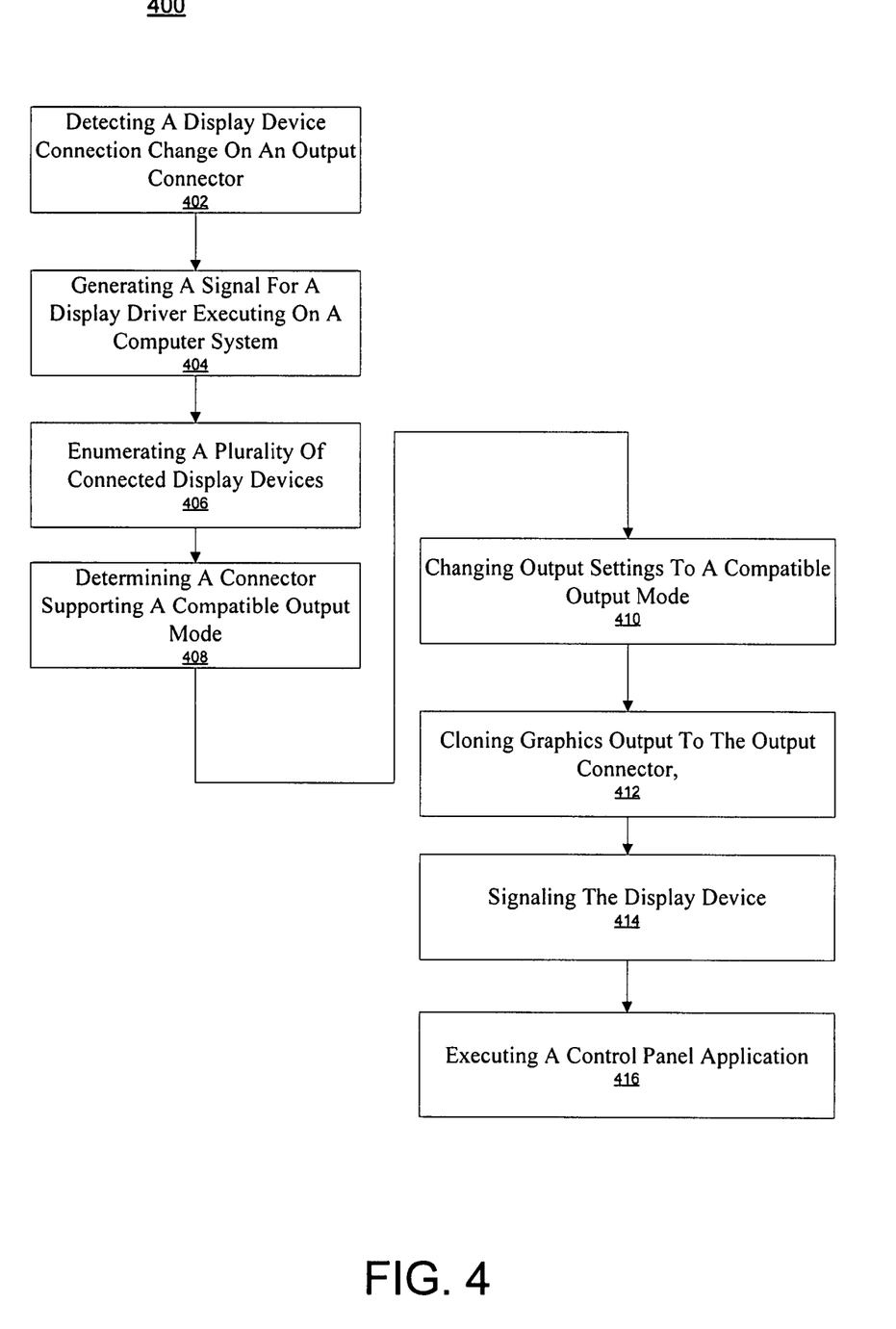
FIG. 4 shows a flowchart of a process for restoring display output for a display device in accordance with one embodiment of the present invention.

FIG. 4 shows a flowchart 400 of a process for restoring visual output so that the output is visible on a display device in accordance with one embodiment of the present invention.

At block 402, a display device connection change (e.g., connection or disconnection) on a first output connector is detected. In one embodiment, when the composite or CVBS connection is made the graphics driver locks the output head to CVBS output and the resolution to a compatible mode output (e.g., 480i for NTSC). Load sensing may be performed on the CBVS connection and the digital to analog converter. As described herein, the load sensing may be coupled to a GPIO pin of a graphics processing unit (GPU). In one embodiment, the change of a connection to a display device may be detected via Hot Plug Detect (HPD).

At block 404, a signal is generated for a display driver executing on a computer system. A pulse as described herein may be received by a GPU and a signal (e.g., interrupt) is generated for service by a display driver. In one embodiment, an interrupt generated by a GPU is handled by an interrupt service routine module which is part of a graphics driver.

At block 406, a plurality of display device connections are enumerated. In one embodiment, the display device connections are determined or examined and used for determining which output connections are most suitable for outputting a compatible output mode. For example, if a display device is connected via a DVI and S-video, a determination may be made to use S-video for outputting a compatible output mode. In another embodiment, display device connection enumeration may be invoked via an application programming interface (API) call.

At block 408, a connector supporting a compatible output mode is determined. In one embodiment, based on the plurality of display device connections enumerated, a display device connection supporting a compatible output mode is selected. For example, if there are multiple connections enumerated such as a composite connection and a HDMI connection, the composite connection may be determined to be the compatible output mode connector to be used in facilitating the restoration of visual output on the display device. It is appreciated that the output connections may be selected in numerous ways. It is further appreciated when there is a single connection to a display device, a compatible output mode may be determined for that connection and the graphics output settings may be modified corresponding to the output compatible mode of that connection.

At block 410, output settings are changed to a compatible output mode on the output connector. It is appreciated that the output settings can be adjusted in numerous ways as described herein. For example, in the case where the display is a NTSC capable display, the output settings (e.g., output timings and resolution) may be adjusted to 480i to ensure that visual output to the display device is restored.

At block 412, graphics output is cloned to the output connector. In one embodiment, cloning is outputting the same graphics content on each connector. As described herein, graphics output from the output connection with non comprehensible visual output may be cloned and adjusted for output in a compatible output mode as described herein. For example, a 1080i signal may be scaled or only a portion the graphics content displayed at a time, both of which facilitate the restoration of visual output on the display device. The cloning may further involve changing the resolution, aspect ratio, refresh rate, and the like and may be set to widely supported settings (480i) or based specific device information (e.g., EDID).

At block 414, the display device is signaled. The display device may be signaled as described herein via a display signaling device (e.g., signaling device 214) coupled to a processor (e.g., processor 204 or processor 206) or the like via a plurality of connections (e.g., USB, serial, RF, IR, or Ethernet). As also described herein, the display device may be signaled to change the input source to a compatible output mode connector just connected and thereby facilitate the automatic restoration of visual output without requiring the user to change the input source on the display device.

At block 416, a control panel application is executed. The control panel as described herein allows the user to adjust output settings for each of the output connections. For example, visual output may have been restored via a composite connector and the user may use the control panel application to adjust output settings for a DVI connector which is currently incomprehensible.

Figure 5:
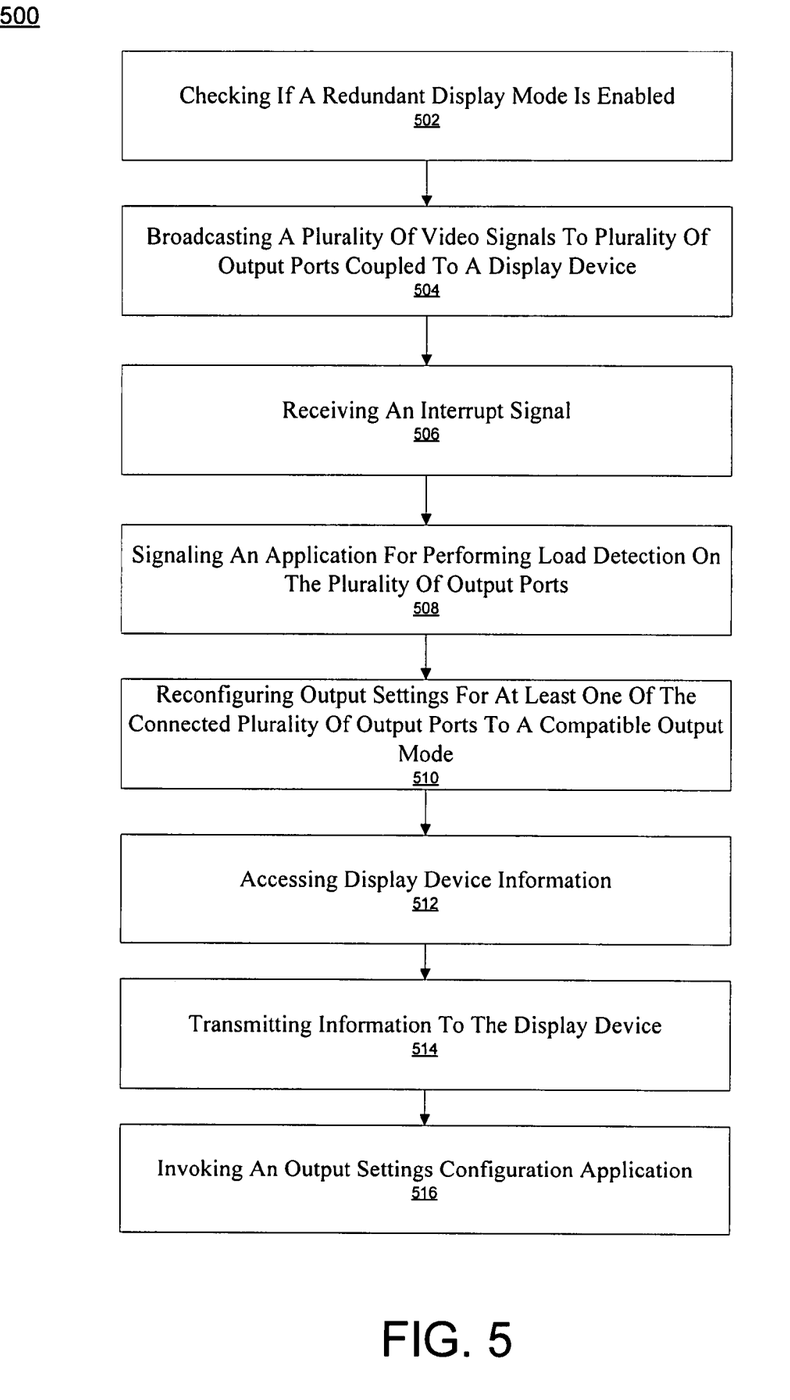
FIG. 5 shows a flowchart of a process for modifying output settings on an output connector so the output is visible on a display device in accordance with one embodiment of the present invention.

FIG. 5 shows a flowchart 500 of a process for modifying output so that the output is visible on a display device in accordance with one embodiment of the present invention.

At block 502, a check as to whether a redundant display mode is enabled is performed. The redundant display mode ensures that output to a compatible mode output connection (e.g., composite) is at output settings (e.g., resolution) supported by all display devices (e.g., 480i). In one embodiment, the redundant display mode may be an option which the user can choose to enable at setup or via a control panel application. In one embodiment, when a redundant display mode is enable and an output connector (e.g., DVI) is coupled to a display device a message may be displayed informing the user to connect the CVBS connection.

At block 504, a plurality of video signals are broadcast to a plurality of output ports coupled to a display device. A redundant display mode may enable broadcasting of multiple video signals over independent outputs to a display device so that the user can easily and quickly switch inputs and restore visual output on the display device.

At block 506, an interrupt signal is received. As described herein, the interrupt may be generated by a GPU in response to signal from an input device or a signal resulting from the connection or disconnection of a display device. In one embodiment, the interrupt signal may be received by a display driver and will be handled by an interrupt service routine module.

At block 508, an application for performing display device detection on the plurality of output ports is signaled. As described herein, an interrupt service routine module of a display driver may invoke (e.g., via an API) an application for enumerating output ports via display device detection.

At block 510, output settings for at least one of the connected plurality of output ports is reconfigured to a compatible mode. The display driver, as described herein, may adjust output settings (e.g., output timing and resolution) on at least one of the output ports to a compatible output mode which restores visual output to the display device. For example, the output settings of the composite connection may be set to 480i to ensure compatibility with display devices. In another embodiment, the display driver may adjust output settings on all output ports to restore visual output on the display and the user is not required to switch the input on the display device.

Figure 6:
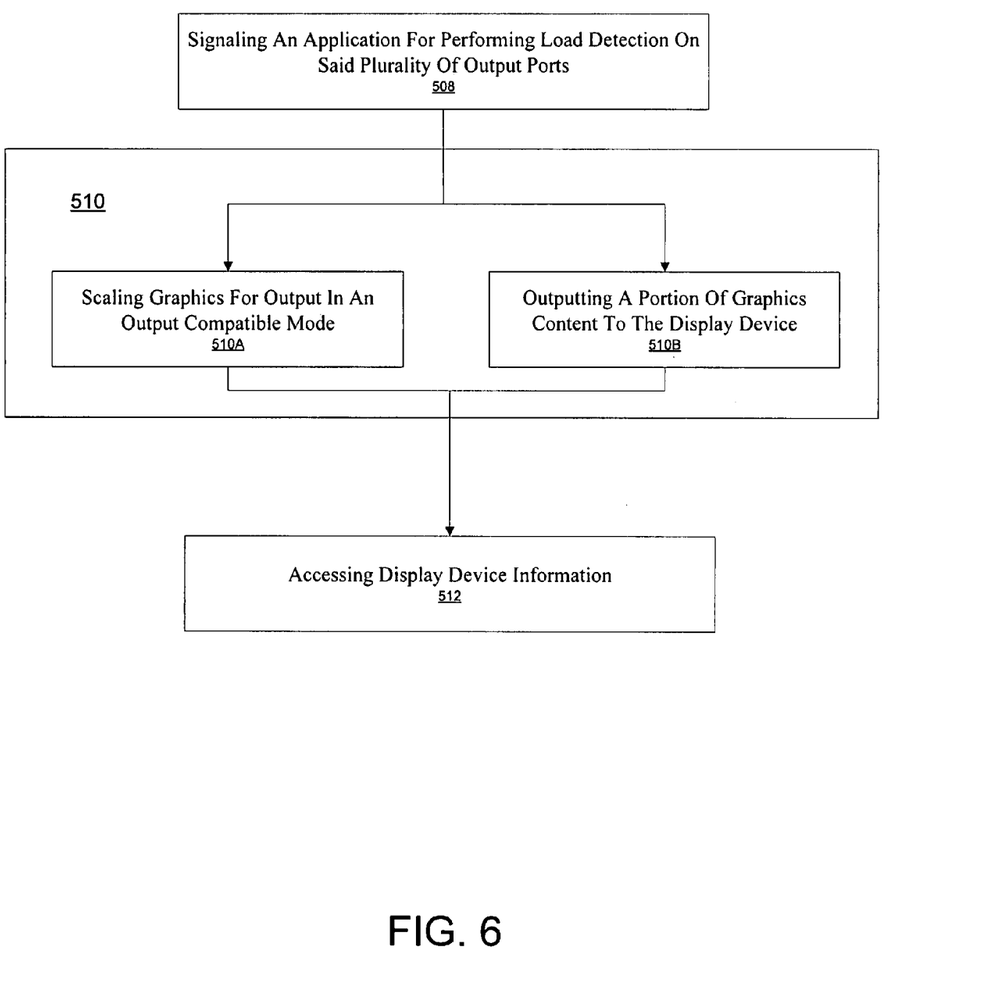
FIG. 6 shows a flowchart of one exemplary implementation of reconfiguring output settings in accordance with one embodiment of the present invention.

FIG. 6 shows exemplary implementations of output port reconfigurations, in accordance with embodiments of the present invention. The various reconfigurations facilitate the use of the visual output by a user to change output settings and thereby restore visual output on the other inputs of the display device.

At block 510a, graphics output is scaled for output in an output compatible format. The display driver may scale or reduce the resolution to suit the compatible mode output (e.g., 480i) in such a way as to retain usability of the graphics output. For example, graphics output of 1280×720 may be scaled down to 720×480 for output via a composite connector.

At block 510b, a portion of graphics content is outputted to the display device. In one embodiment, the portion output by the display driver corresponds to the compatible output mode. For example, if the graphics output is 1920×1080, a portion corresponding to 720×480 may be output on the display device. In one embodiment, that user may pan and scan or navigate around in areas corresponding to the compatible output mode and the portion visible on the output device. In another embodiment, a fixed portion of the graphics output is displayed. For example, the upper left portion of graphics output is displayed.

Referring back to FIG. 5, at block 512, display device information is accessed. As described herein, the information accessed may be a display device profile or the like which contains model and signaling information including, but not limited to, the appropriate signal to change the input source on the display device. In one embodiment, the information may have been stored or selected by a user via an output settings application (e.g., control panel application).

At block 514, information is transmitted to the display device. As described herein, the information transmitted to the display device may invoke various functions of the display device including changing the input source. Thus, the input of the display device may be set to the connection that has just been connected by a user and the corresponding graphics output settings have been modified as described herein.

At block 516, an output settings application is invoked. As described herein, the output settings application may be invoked by a display driver or display driver service application and allows a user to adjust output settings for each output connection or port. In one embodiment, the control panel may be invoked in the location corresponding to the portion of graphics being displayed. For example, where a fixed upper left portion of graphics content being output, the control panel window or interface may be located in the upper left portion to ensure a user can adjust the output settings.

Figure 7:
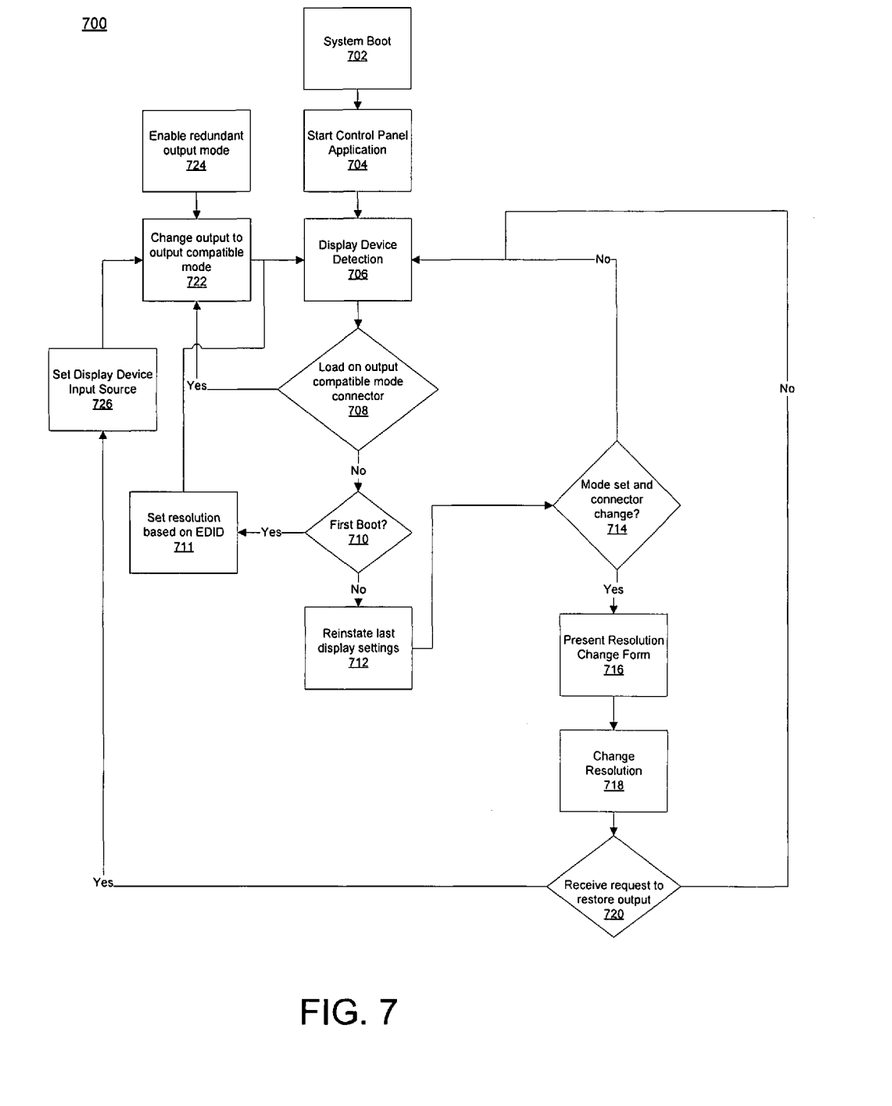
FIG. 7 shows a flowchart of a process for operating a system in accordance with one embodiment of the present invention.

FIG. 7 show a flowchart 700 of a process for operating a system in accordance with one embodiment of the present invention.

At block 702, a system is booted. The system may be a computing system which has multimedia capabilities and is connected to a display device (e.g., LCD, HDTV, and the like) that has been restarted or booted from a turned off state.

At block 704, a control panel application is started. The control panel application, as described herein, may start and run in a hidden or invisible mode so that it is quickly available to change output settings and sense changing in load or forced mode switches (e.g., user invokes output settings changes).

At block 706, display device detection is performed. The load (e.g., electrical) may be detected on each output interface (e.g., S-Video, YPrPb, or composite) or the display device may be signaled via I²C (e.g., VGA, DVI, or HDMI) as described herein. For example, an HDMI and composite connection may be detected. During display device detection, extended display identification data (EDID) may be received which describes the capabilities of a display device.

At block 708, a check if there is a load on an output compatible mode connector is made. As described herein, display device detection or enumeration may be performed to determine if a widely supported compatible output mode connector (e.g., CVBS or S-video) is connected.

At block 710, a check if this is the first boot of the system is performed. First boot information may be stored on a storage device (e.g., hard drive) within the computing system.

At block 711, the resolution is set based on EDID. During the first boot, output settings such as resolution may be set based on the EDID which provides information on the capabilities of a display device.

At block 712, the last or previous display or output settings are reinstated. When the boot sequence is determined to be other than a first boot, previous display settings may be applied.

At block 714, a check if there is a change to the mode setting or connectors is performed. More specifically, a check may be made if different connectors or different output settings have been applied.

At block 716, a resolution change form is presented. The resolution change form may be part of an output configuration or control panel application as described herein.

At block 718, the resolution is changed. A resolution change may be applied after being selected by a user from within an output configuration tool which may exceed the capabilities of the display device and result in loss of visual and comprehensible output.

At block 720, a check is made if a request to restore output is made. In one embodiment, the request may have been made via a remote control button or chassis button as described herein by a user in response to a resolution change which resulted in output of a display device being incomprehensible. In another embodiment, the request may have been received when the user connected or disconnected a display device.

At block 726, a display device input source is set. As described herein, the input source that the display device uses to provide visual output may be set to the corresponding connector supporting a compatible output mode. For example, if a user disconnects an HDMI connector and then connects a composite connection, the display device may be signaled to change the input source to the composite connections as a source for visual output. The user will thus be able to change connectors and have visual output restored without having to change the input source on the display device.

At block 722, output is changed to a compatible output mode. As described herein, the output may be activated on a compatible output mode connector (e.g., composite) and the output configured to a compatible output mode (e.g., 480i) or otherwise tailored to the display device (e.g., based on EDID and the like).

At block 724, a redundant output mode is enabled. As described herein, the redundant output mode may be enabled via an input device (e.g., remote control).

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for restoring display output to a single display device, comprising:
   receiving an interruption indication indicating that a connection change on at least one of a first output connector and a second output connector coupled between a first processor and said single display device occurred responsive to said single display device failing to display graphics output generated by said first processor because an output setting of said graphics output is incompatible with said single display device;
   responsive to said interruption indication, changing output settings of said graphics output to a compatible output mode that is compatible with at least one of the first output connector and the second output connector and said single display device;
   cloning said graphics output to said at least one of the first output connector and the second output connector;
   signaling said single display device to change an input source of said single display device by changing from a first input connector of said single display device to a second input connector of said single display device, wherein the first input connector is coupled to the first output connector and the second input connector is coupled to the second output connector; and
   executing instructions of a control panel application to present an on-screen control user interface on said single display device, wherein said on-screen control user interface is configured to receive user inputs for changing the output settings of said graphics output.

2. The method of claim 1 further comprising:
   generating an interrupt for a display driver executing on a computer system, the display driver configured to control a display processor of the computer system.

3. The method of claim 1 wherein further comprising:
   enumerating a plurality of connected display devices.

4. The method of claim 1 wherein said single display device is signaled via an infrared emitter.

5. The method of claim 3 further comprising:
   determining a connector of at least one of the first output connector and the second output connector supporting the compatible output mode; and
   determining the display device signal corresponding to the connector supporting the compatible output mode.

6. The method of claim 1 wherein said compatible output mode corresponds to a lowest resolution supported by said single display device.

7. The method of claim 1 wherein said signaling is based on display device information stored by an output settings application.

8. A system for outputting graphics, comprising:
   a plurality of output connectors;
   a first processor coupled to said plurality of output connectors and operable to handle graphics processing and provide graphics output to display devices via said plurality of output connectors,
   wherein said plurality of output connectors are configured to detect a connection change of a display device that occurs responsive to said display device failing to display graphics output generated by said first processor, and signal said first processor,
   wherein said first processor is further configured to: responsive to said connection change, to change output settings of graphics output to a compatible output mode that is compatible with an output connector of said plurality of output connectors and a connected display device that is coupled with said first processor after said connection change; clone the graphics output to said output connector; and signal said connected display device to change an input source of said connected display device by changing to an input connector that is coupled to said output connector; and
   a second processor coupled to said first processor and configured to, responsive to said connection change, executing instructions of a control panel application to present an on-screen control user interface on said connected display device, wherein said on-screen control user interface is configured to receive user inputs for changing the output settings of said graphics output.

9. The system of claim 8 wherein said display device is signaled via a USB connection, and wherein said display device and said connected display device are a same display device.

10. The system of claim 8 wherein said display device is signaled via a serial connection.

11. The system of claim 8 wherein said display device is signaled via an Ethernet connection.

12. The system of claim 8 wherein said display driver is signaled via a home automation connection.

13. The system of claim 12 wherein said home automation connection is an X10 connection.

14. A non-transitory computer readable storage medium having computer-executable instructions for performing a method of modifying graphics output for displaying, said method comprising:
   checking if a redundant display mode of graphics output is enabled;
   if a redundant display mode is enabled, broadcasting a plurality of video signals to a plurality of output ports coupled to a display device;
   receiving an interrupt signal, responsive to a disconnection of the display device from a graphics processing unit, wherein said disconnection occurs when said display device fails to display graphics output provided by said graphics processing unit;
   responsive to said interrupt signal, reconfiguring output settings of graphics output to a compatible output mode that is compatible with a connected output port coupled between a connected display device and said graphics processing unit;
   transmitting information to said display device to change the selected input source on the connected display device corresponding to said connected output connector, wherein said information signals said display device to use an input connector of said connected display device, wherein said input connector is coupled to said connected output connector; and
   responsive to said interrupt signal, invoking instructions of an output settings configuration application to render a control user interface on said connected display device, said control user interface is configured to receive user inputs for changing the output settings of said graphics output.

15. The non-transitory computer-readable storage medium of claim 14 having computer executable instructions further comprising:
   scaling said graphics output to an output compatible mode, and wherein said display device and said connected display device correspond to different display devices.

16. The non-transitory computer-readable storage medium of claim 14 having computer executable instructions further comprising:
   outputting a portion of graphics content to the connected display device.

17. The non-transitory computer-readable storage medium of claim 14 further comprising:
   accessing display device information.

18. The non-transitory computer-readable storage medium of claim 17 wherein said display device information comprises data for controlling said connected display device.

19. The non-transitory computer-readable storage medium of claim 14 wherein said output settings configuration application facilitates selection of said display device information.

20. The non-transitory computer-readable storage medium of claim 14 having computer executable instructions wherein said information transmitted to said connected display device is a generic signal.

21. The method of claim 1 wherein said signaling said display device comprises signaling said single display device to change from a first input source to a second input source.

22. The method of claim 1 further comprising:
   adjusting output settings on each output connector of a plurality of output connectors to said compatible output mode.

* * * * *